(12) United States Patent
Lindblom

(10) Patent No.: US 8,725,287 B2
(45) Date of Patent: May 13, 2014

(54) THREE-DIMENSIONAL GOODS STORAGE ARRANGEMENT IN WHICH THE SPACE TAKEN UP BY THE GOODS IS REDUCED IN RELATION TO THE GOODS STORAGE CAPACITY

(75) Inventor: Bo Lindblom, Osby (SE)

(73) Assignee: Texo Application AB, Almhult (SE)

( * ) Notice: Subject to any disclaimer, the term of this patent is extended or adjusted under 35 U.S.C. 154(b) by 0 days.

(21) Appl. No.: 13/583,696

(22) PCT Filed: Feb. 28, 2011

(86) PCT No.: PCT/SE2011/000040
§ 371 (c)(1),
(2), (4) Date: Sep. 10, 2012

(87) PCT Pub. No.: WO2011/119083
PCT Pub. Date: Sep. 29, 2011

(65) Prior Publication Data
US 2013/0006412 A1 Jan. 3, 2013

(30) Foreign Application Priority Data
Mar. 25, 2010 (SE) ...................... 1000287

(51) Int. Cl.
*G06F 7/00* (2006.01)
(52) U.S. Cl.
USPC ......................................................... 700/218

(58) Field of Classification Search
None
See application file for complete search history.

(56) References Cited

U.S. PATENT DOCUMENTS

| 4,732,524 A | 3/1988 | Suominen |
| 2009/0048704 A1* | 2/2009 | Redford ........................ 700/224 |

FOREIGN PATENT DOCUMENTS

| EP | 0894740 | 2/1999 |
| EP | 1627830 | 2/2006 |
| JP | 61-229705 | 10/1986 |
| JP | 10-087020 | 4/1998 |

OTHER PUBLICATIONS

International Search Report from corresponding International Application No. PCT/SE2011/000040, dated Jun. 23, 2011.

* cited by examiner

*Primary Examiner* — Yolanda Cumbess
(74) *Attorney, Agent, or Firm* — Renner, Otto, Boisselle & Sklar, LLP

(57) ABSTRACT

A three-dimensional goods storage arrangement includes a system of beams with a number of levels and, arranged in these and extending in two main directions, channels for goods. A lift is included together with transport elements and is controlled by control elements and sensors for automated transfer of goods. Time or date information concerning the arrival and expected dispatch of the goods influences the automated transfer of goods in order to shorten the time at dispatch.

8 Claims, 5 Drawing Sheets

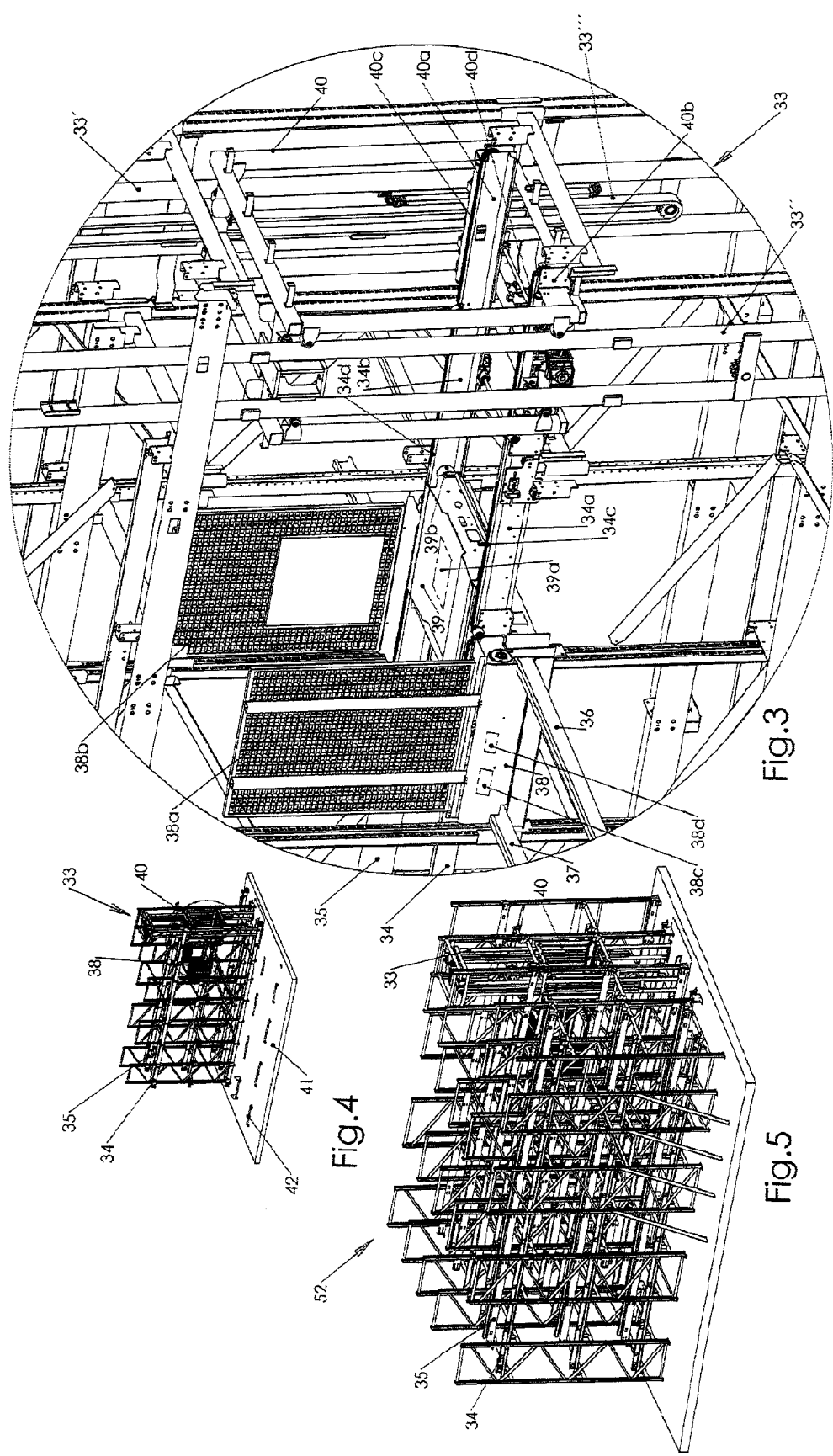

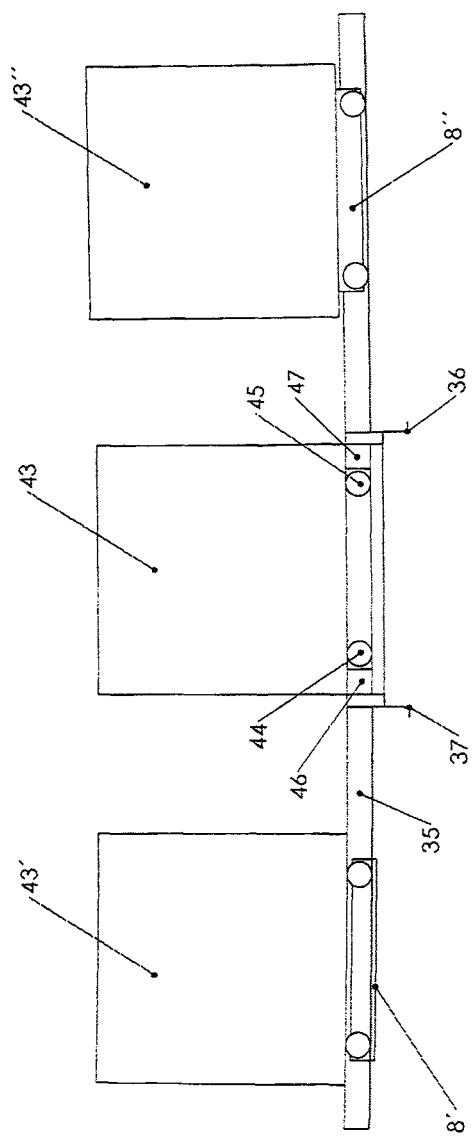

Figure 1:
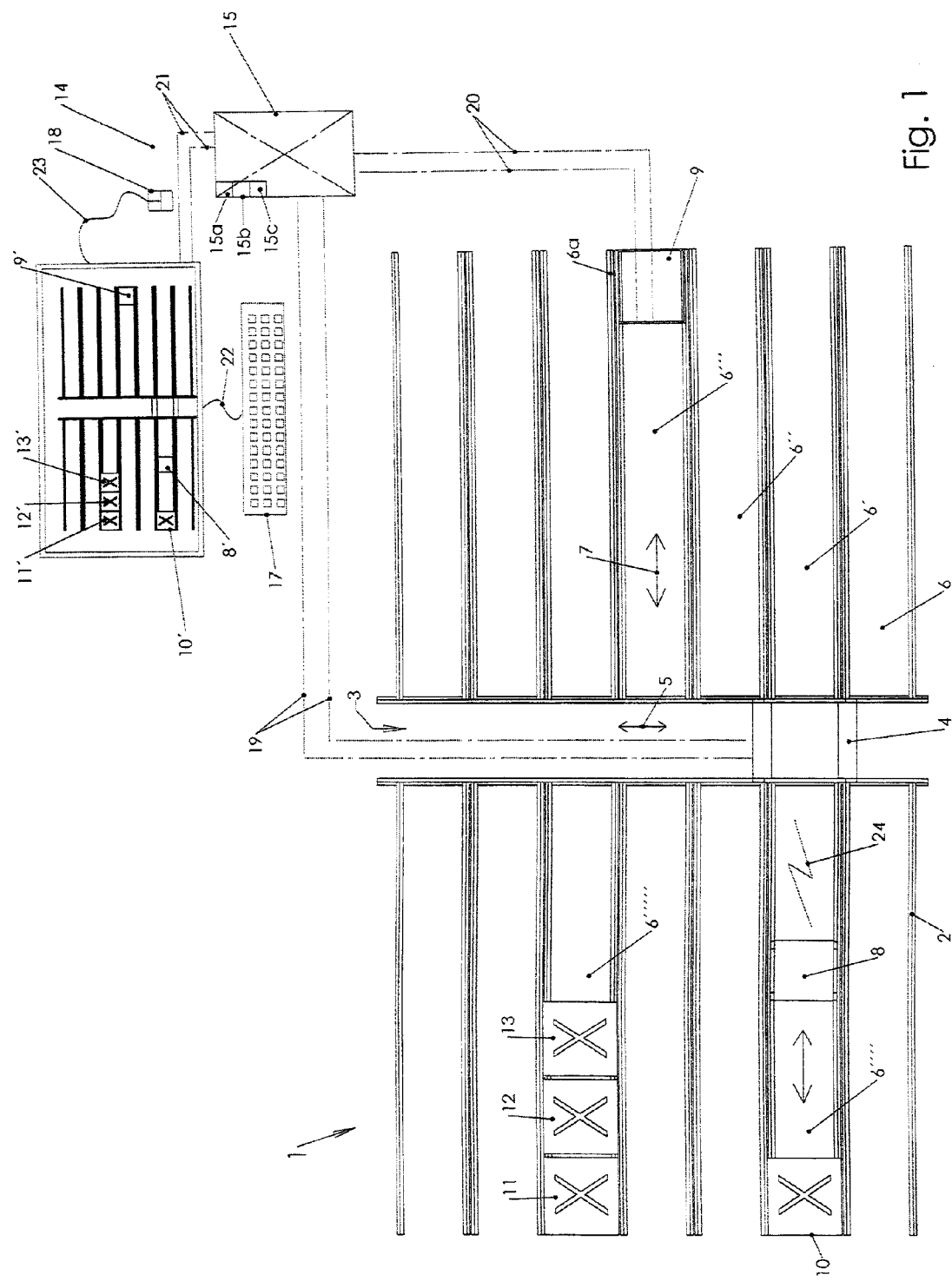

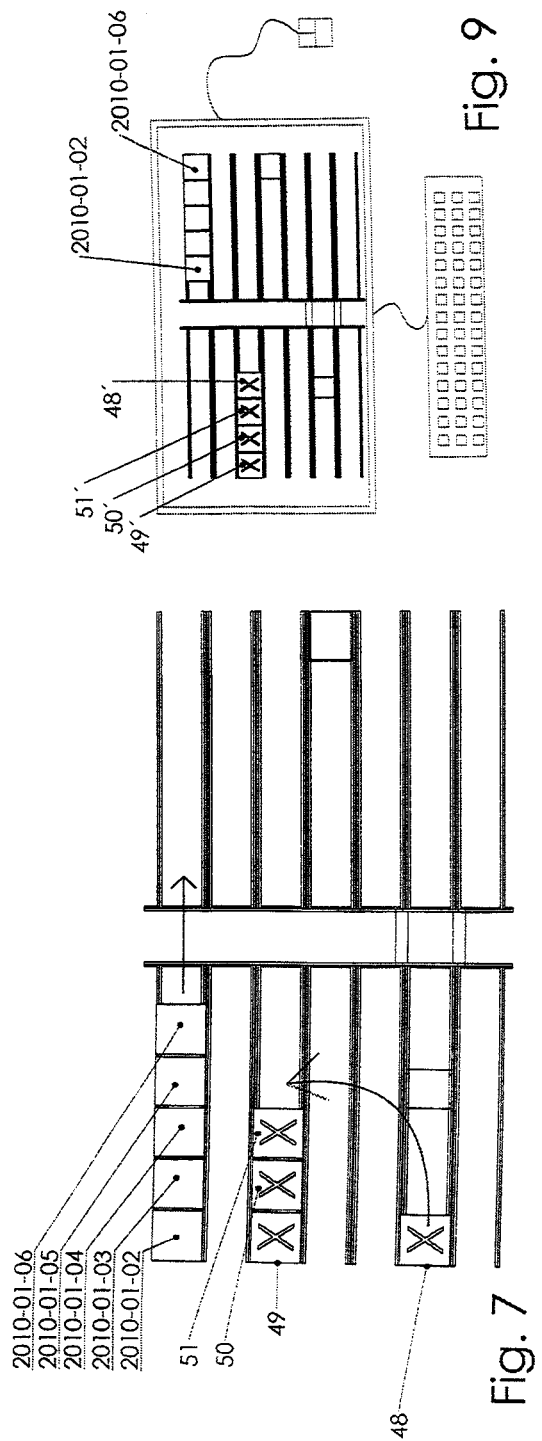
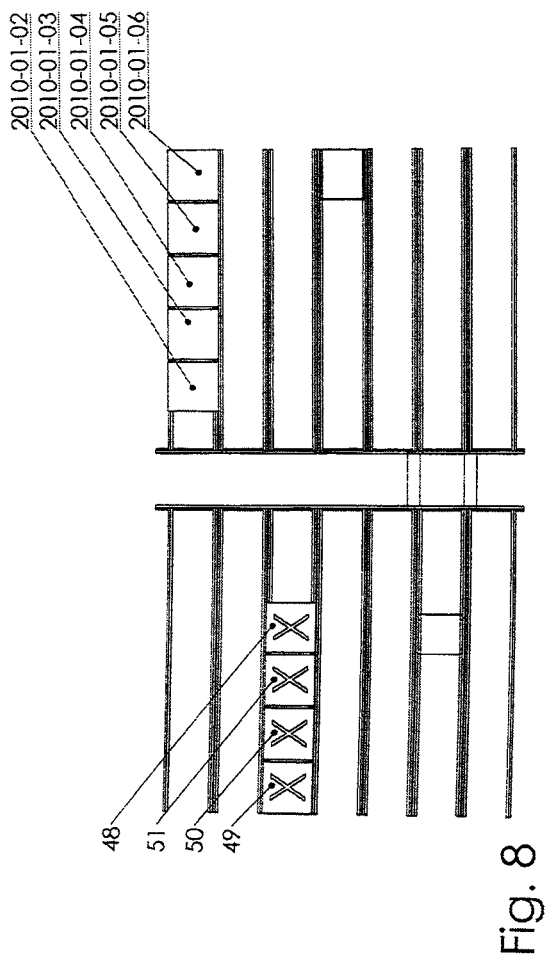
Fig. 7
Fig. 8
Fig. 9

THREE-DIMENSIONAL GOODS STORAGE ARRANGEMENT IN WHICH THE SPACE TAKEN UP BY THE GOODS IS REDUCED IN RELATION TO THE GOODS STORAGE CAPACITY

The present invention relates to a three-dimensional goods storage arrangement in which the space taken up by the goods is reduced in relation to the goods storage capacity. The arrangement comprises a system of beams with two or more levels and, arranged in these and extending in two main directions, passages/channels for goods. First transport elements in the form of one or more lifts, which are applied to the system of beams, are movable between the levels, and second transport elements are included for transport to and from selected locations in the passages/channels for the goods. Control elements and sensors for controlling the first and second transport elements are also included. Said passages/channels have extents which, even when the goods are placed tightly together, permit short dispatch times for the goods. The control elements and sensors also comprise means for automated transfer of goods. Each level or section thereof comprises only one passage or channel extending in the first main direction. The first passage or channel is provided with a first path or track. A carriage belonging to the second transport elements is provided with first drive elements, by means of which the carriage can be driven on the first path or track in order to be able to position the carriage in line with a number of second passages or channels which are located alongside one another and which extend in the second main direction. The second passages or channels are provided with second paths or tracks. One or more satellites are provided, each with a second drive element by means of which each satellite can be driven on each second path or track. The carriage has support elements for each satellite that can be driven onto or off of the carriage at each second passage or channel. One passage or channel of the second passages or channels, at its end facing away from the first passage or channel, is designed to allow goods to be input into and output from the level or the level section via the lift thereof and by means of the associated satellite.

Such arrangements can be regarded as being already known at least in part, and reference is made, inter alia, to the goods storage systems marketed by the same applicant filing the present invention. In purely general terms, reference is also made to EP0894740 A1, JP61229705 A, EP 1627830 A1 and U.S. Pat. No. 4,732,524 A.

Thus, for example, it is known to use so-called satellites (also referred to as shuttles) in the system or arrangement. The satellites are provided with batteries for driving them in the system or arrangement. They are also under wireless control from a control unit that can comprise computer equipment with control elements such as mouse, keyboard, etc. The satellites are of a kind which, in a manner known per se, can be driven in under the actual goods item, e.g. pallets with goods, and which, by means of associated support elements, are able to lift the pallet or the goods item and transport the latter between different locations in the system. The transport or transfer carriages in the system are provided with electrical driving and controlling elements which can be supplied with electricity via fixed electrical connections. Alternatively, the carriages can also be provided with batteries and controlled via wireless connections. The goods item can be on a pallet or not on a pallet.

Said computer equipment can be provided with control means that can include programs for controlling the carriages and the satellites and are thus able, by means of these programs, to effect automated transfer of goods in the arrangement/system.

In this type of arrangement, there is a great need to achieve small floor space in relation to the storage capacity of the arrangement. There is also a requirement to obtain a high degree of automation and optimized connections to computer systems (WMS). The goods must be able to be handled safely, and the need for forklift trucks must be eliminated. If the goods are carried on pallets, the system must be able to be easily adapted to different pallet sizes. There are also great demands for user-friendliness, for example the importance of a reliable degree of recognition of the goods. The arrangement must be able to be expanded, and the capacity must be able to be increased with the aid of a greater number of lifts, transfer carriages and satellites.

The object of the invention is to solve one or more, preferably all, of these problems. The feature that can principally be regarded as characterizing an arrangement according to the invention is that said time or date information for the automated transfer of goods/restowing of goods is included in a first-in and last-out set-up for the automated transfer of goods/restowing of goods. Moreover, each lift is provided with goods input elements which, at a high input speed for the goods item, drive the latter into the second passage or channel at the same time as the satellite works with a goods entry capacity that is below said input speed. Each lift can be provided with goods output elements which, at a high output speed by means of the satellite or satellites, drive the goods out when the satellite or the satellites work with a goods output capacity that exceeds the output capacity of the lift. Finally, the means comprises a control function which reverses the order of the first-received goods item, which has been placed farthest inside a second passage, with subsequent goods items that have been placed outside the first-received goods item.

In developments of the inventive concept, a function for the transfer of goods includes a goods transfer strategy that increases the accessibility to the goods item relevant to an upcoming or current dispatch from the system. The goods transfer strategy comprises carrying out the transfer of goods during selected time periods, e.g. night time, holidays, etc. Each goods item or pallet can be marked by means of the control elements and sensors, e.g. by means of a mouse included in these. The arrangement can be expanded by means of the levels being divided into level sections with one or more lifts, one carriage and, serving the latter, one or more satellites, e.g. 2-5 satellites. The support elements on the carriage for each satellite can comprise a first plate, and each satellite can have lifting elements that can be lowered under each pallet or goods item and can be elevated for lifting the pallet or the goods item. The lift can be designed with set-down elements for goods that can be collected when the lift is sent to another level.

By means of what has been proposed above, it is possible to achieve an arrangement which has great capacity, small space requirements in relation to the capacity, and integration with existing computerized systems. The control is simple, and conventional programs can be used for the control between periods of use and idle times (nights, holidays, lunch breaks, etc.).

Figure 2:
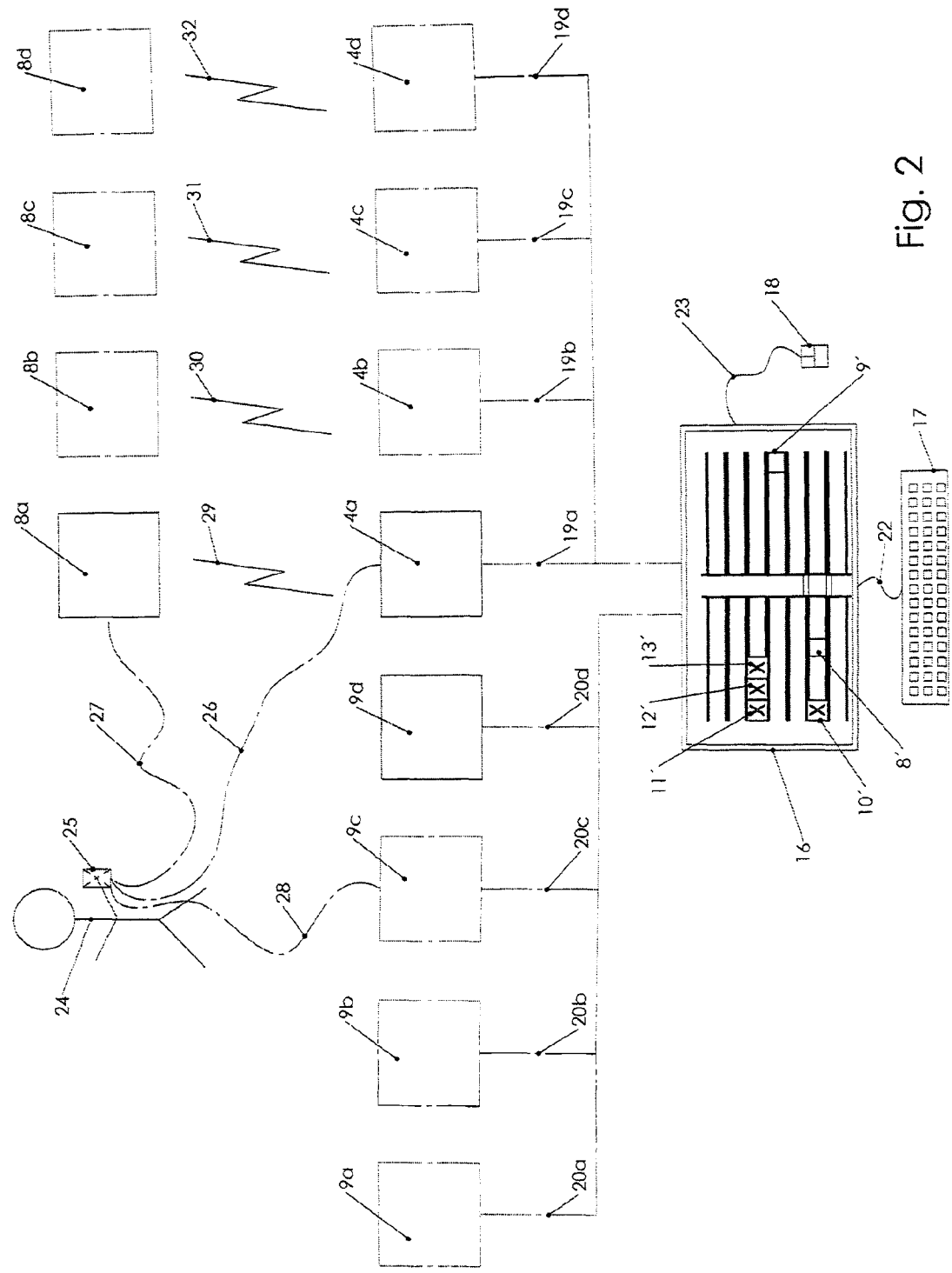

A presently proposed embodiment having the significant features of the invention will be described below with reference to the attached drawings, in which FIG. 1 shows a schematic horizontal view of a level or a level section of a goods storage arrangement, including carriage and shuttle and passages or channels together with lift position and computerized control elements and sensors, FIG. 2 shows a schematic horizontal view illustrating that the control elements and sensors can also comprise equipment carried by an operator, FIG. 3 shows a perspective view of parts included in the arrangement, seen obliquely from above and from the left, FIG. 4 shows, in a perspective view seen obliquely from above and from the left, parts of the arrangement in FIG. 3 including beams and details of the lift arrangement, FIG. 5 shows, in a perspective view seen obliquely from above and from the left, a system of beams included in the arrangement with carriage, satellite and lift arrangement mounted on a partially indicated floor surface, FIG. 6 shows a side view of, on the one hand, a carriage carrying a satellite with loaded goods, and, on the other hand, first and second positions for a satellite with loaded goods when driven off the carriage, FIG. 7 shows a schematic horizontal view of first positions for goods, FIG. 8 shows a schematic horizontal view of second positions for the goods after the transfer function, and FIG. 9 shows a schematic horizontal view of the tracking and control of the control elements and sensors in the transfer function.

FIG. 1 represents a goods storage arrangement of one level 2. In the present case, one complete level 2 of a first size is shown. The level can also represent a section within a level of a second size which is greater than the first size and forms the level together with shown or not shown further levels. Each further level has in principle the same configuration as the one shown in FIG. 1. A first passage or channel 3 intended for a transport or transfer carriage 4 is arranged in the level or section 2. Said passage or channel 4 extends in a first main direction 5. The level or the level section is also provided with second passages or channels 6, 6', 6", etc., which are positioned closely adjacent to one another and which extend in a second main direction 7 preferably at right angles to the first main direction. The second passages or channels are located on both side of the first passage or channel. The second passages or channels are intended for a satellite (shuttle) 8. The drivable carriage 4 can be positioned in line with each passage or channel. In a selected second passage or channel 6''', at the end 6g of said passage or channel facing away from the first passage or channel, there is a lift 9, by means of or via which goods (not shown) can be driven into and out of the level or level section. The input and output capacities of the lift can be greater than or less than the input and output speeds of the satellite or satellites. Each satellite 9 can be driven in under the respective goods item which, in the case described, is situated on a pallet under which the satellite can drive in and lift the pallet together with the loaded goods. The satellite 8 can be driven onto and off of the carriage 4 when the latter is positioned in line with the relevant second passage or channel in which the satellite is located. The satellite can thus be transported by the carriage 4 to the channel 6''' and collect goods from the lift 9 and be driven back to the carriage 4 which transports it to the mouth of the second passage or channel in which the collected goods item is to be placed. Having conveyed said goods to a selected location, the satellite can be made to collect new goods, etc. The satellite can also perform the opposite function and collect a load and deposit it on the lift with the aid of the carriage. The satellite and the carriage can also be made to collect and deposit goods between different second passages and channels and in this way transfer the goods or the pallets between different locations in the second passages or channels. FIG. 1 shows the case where goods/pallets 10, 11, 12 and 13 have been placed in the second passages or channels 6"" and 6""'.

The positions of the goods/pallets and carriage and satellite/satellites are detected and controlled by control elements and sensors which, in the case shown, comprise a CPU 15 and an associated screen 16 with keyboard 17 and operating elements, e.g. mouse 18, voice control, pen control, etc. The computer unit/CPU comprises a means in the form of a program of conventional type. The program, the memory and time controllers are shown symbolically by 15a, 15b and 15c, respectively. According to FIG. 1, the CPU controls, on the one hand, the carriage 4 via a connection 19, which can be wired or wireless, and, on the other hand, the lift 9 via a connection 20, which can likewise be wired or wireless. The CPU can start up the computer screen 16 via a wireless or wired connection 21. In the present case, the computer screen has been made to present the positions 10', 11', 12', 13' for the goods or pallets introduced, and also the positions 8' and 9' of the satellite 8 and lift 9. Different images and situations can be presented on the screen 16 with the aid of the keyboard 8' and the element 18. The connection between keyboard and computer screen is shown by 22, and the connection between the element 18 and the screen 16 is shown by 23. The reference sign 24 indicates that the satellite is movable in both directions in the second passages or channels.

FIG. 2 is intended to show that the control and sensor functions can also be performed by means of a control unit 25 that forms part of said control elements and sensors and that can be carried by an operator.

Said sensor and control functions are provided for all the carriages, satellites and lifts in the different levels and/or level sections of the arrangement. The carriages are represented here by 4a, 4b, 4c and 4d, the satellites by 8a, 8b, 8c and 8d, and the lifts by 9a, 9b, 9c and 9d. The connections between the screen 16 and the carriages are represented by 19a, 19b, 19c and 19d, the connections between the screen and the lifts by 20a, 20b, 20c and 20d. The wireless connections activated in FIG. 2 between the unit 25 and the carriage 4a, satellite 8a and lift 9c are indicated by 26, 27 and 28, respectively. Moreover, wireless connections 29, 30, 31 and 32 can be present between the carriages and the satellites in the different levels or sections. The other reference signs correspond to those in FIG. 1.

FIGS. 3, 4 and 5 are intended to show a specific illustrative embodiment of an arrangement according to the invention. The arrangement comprises a system of beams with a lift shaft or lift space 33, which has vertical bars 33' and 33".

A second passage or channel is represented by means of a track or path that comprises parallel rails 34, 35.

At the lift shaft, the system of beams is provided with a shorter track section whose rails have been indicated by 34a and 34b, which are provided with a chain conveyor function, indicated by drive chains 34c and 34d.

A corresponding track or path in the first passage or channel is indicated by 36, 37. A carriage that can be driven on the last-mentioned track or path is shown by 38, and a satellite that can be driven onto and off of the carriage is shown by 39. The carriage 38 is provided with side parts 38a and 38b. The carriage is provided with electric drive elements 38c which, in the present case, are driven from the electricity network via an electrical cable (not shown).

The satellite 39 is provided with a battery 39a, and its wheels bearing on the track are represented by the wheel 39b. The support elements on the carriage for the satellite attach to the track or path of the satellite in the position in line with the respective second passage or channel.

The attachment of the level or of the level section to a lift 40 in the lift shaft 33 is shown by 40. The lift comprises track parts 40*a*, 40*b* that can be positioned in line with the track 34, 35 of the satellite. The continuation track has a chain drive 40*c* and 40*d*, which can be activated in the absence of the satellite during the input/output movements discussed above. The track parts 34*a* and 34*b* can be positioned in line with the track parts 40*a* and 40*b* of the lift, and the chain drive 34*c* and 34*d* can be positioned in line with the chain drives 40*a* and 40*d*. The satellite can collect or deposit the goods item on the track parts 34*a* or on the track parts 40*a* and 40*b*. The satellite can drive in underneath the goods item and lift the latter or can lower the goods item onto the chain drives. The lift or lift cage is driven in the vertical direction on the track 33' and 33" by a chain drive 33'''.

FIG. 4 shows part of the system of beams mounted on a ground surface (floor) 41, which is designed with recesses 42 for insertion of beams. The erection has been completed in FIG. 5.

FIG. 6 is intended to show, in the middle part of the figure, the carriage 4 with a satellite that is driven on and that carries goods 43. The carriage rails or track are designated by 36 and 37 (cf. FIGS. 3-5) and extend at right angles to the plane of the figure. The track or path of the satellite is shown by 35 (cf. FIGS. 3-5). The left-hand part of the figure represents the case where the satellite has been driven off the carriage towards the left, and the right-hand part of the figure represents the case where the satellite has been driven off the carriage towards the right in a second passage or channel which is in line with the left passage or channel. Two of the four satellite wheels that can cooperate with the track or path are indicated by 44 and 45, and two of the four wheels of the carriage are shown by 46 and 47.

FIGS. 7, 8 and 9 show the case where a goods unit that has been driven in has been placed in a second passage or channel depending on the date of entry. Goods of an earlier date have been placed far inside the second passage or channel, and, the earlier the date the entry took place, the farther inside the channel. Thus, in the example shown according to FIG. 7, goods entered on Feb. 1, 2010 are in a position farthest inside a first second passage or channel and are followed by goods that were entered on Mar. 1, 2010, Apr. 1, 2010, May 1, 2010 and Jun. 1, 2010. By means of the invention, the order can be reversed by using a second second passage or channel, e.g. an opposite channel. FIG. 8 shows this having been done and with said goods items present in reverse order, wherein the goods item entered on Jun. 1, 2010 lies farthest inside the selected new second passage or channel, etc. FIGS. 7 and 8 also illustrate that the goods item 48 in a second passage or channel can be transferred to a second passage or channel that accommodates the goods 49, 50 and 51. With the aid of the restowing function, a goods item that entered first and was therefore placed far inside the system is assigned a position in which accessibility to the goods item greatly increases and the goods item is much easier, from the point of view of time, to ship out with the aid of the carriage. A great deal of time is thus saved, and considerable packing possibilities can be achieved.

FIG. 9 illustrates the function for the automated restowing according to FIGS. 7 and 8. The corresponding positions that are desired, and that are to be shown on the keyboard, have been indicated by 48', 49', 50' and 51'. The reversed order has been indicated by the dates Feb. 1, 2010 and Jun. 1, 2010.

Each carriage comprises charging elements 39*a* for the satellite batteries, and charging takes place when the satellite assumes its position on the carriage. The lift deposits the goods it is carrying, and the satellite can collect the goods when the lift takes up a position at another level. The system of beams is indicated overall by 52.

The invention is not limited to the embodiment shown above and instead can be modified within the scope of the attached claims and the description.

The invention claimed is:

1. Three-dimensional goods storage arrangement wherein the space taken up by the goods is reduced in relation to the goods storage capacity, and the three-dimensional goods storage arrangement comprising:
 a system of beams with two or more levels and, the beams are arranged in the levels and extending in two main directions to form channels for goods,
 first transport elements in the form of at least one lift, the lift applied to the system of beams and movable between the levels,
 second transport elements for transport to and from selected locations in the channels for the goods, and
 control elements and sensors for controlling the first and second transport elements, said control elements and sensors comprise means for arrival and dispatch of goods,
 wherein said channels have extents which, even when the goods are placed tightly together, permit short dispatch times,
 wherein each level thereof comprises only one first channel extending in the first main direction, the first channel is provided with a first path,
 wherein a carriage belonging to the second transport elements is provided with first drive elements, by means of which the carriage is driven on the first path to position the carriage in line with a number of second channels wherein the second channels are located alongside one another and which extend in the second main direction, the second channels are provided with second paths,
 wherein one or more satellites are provided, each with a second drive element, by means of which each satellite is driven on each second path, said carriage has support elements for each satellite that is driven onto or off of the carriage at each second channel, one channel of the second channels, at its end facing away from the first channel, is configured to allow goods to be input into and output from the level via the lift thereof and by means of each satellite,
 wherein said satellite means comprise receiving members for time or date information concerning the arrival and expected dispatch of the goods and, with this information, influences an automated transfer/restowing of goods in order to shorten the time at dispatch, wherein said time or date information for the automated transfer/restowing of goods is included in a first-in and last-out set-up for the automated transfer/restowing of goods,
 wherein each lift is provided with goods input elements which, at high input speed for the goods, introduce the last-out goods into the second channel at the same time as the satellite works with a goods insertion capacity that is below said input speed,
 wherein each lift is provided with goods output elements which, at high output speed by means of the satellite or the satellites, outputs the goods when the satellite or the satellites work with a goods output capacity which exceeds the output capacity of the lift, and
 wherein the satellite means comprises a control function which reverses the order of the first-received goods that has been placed far inside the second channel, with subsequent goods items having been placed outside the first-received goods.

2. The three-dimensional goods storage arrangement according to claim 1, wherein the function for transfer of goods comprises a goods transfer strategy that increases the accessibility of the goods that is relevant to an upcoming or current dispatch from the system, and wherein the goods transfer strategy comprises carrying out the transfer of goods during selected time periods.

3. The three-dimensional goods storage arrangement according to claim 1, wherein each goods can be marked by means of the control elements and sensors.

4. The three-dimensional goods storage arrangement according to claim 1, wherein the arrangement is expandable by the levels being divided into two or more level sections and having one or more lifts, one carriage, and, serving the carriage, one or more satellites.

5. The three-dimensional goods storage arrangement according to claim 1, wherein the support elements of the carriage for each satellite comprise a first plate, and wherein each satellite has lifting elements that are lowered under each goods and can be elevated in order to lift the goods.

6. The three-dimensional goods storage arrangement according to claim 1, wherein each carriage comprises charging elements for the satellite battery or batteries and charges these when the satellite is located on the carriage.

7. The three-dimensional goods storage arrangement according to claim 1, wherein the lift includes set-down elements for goods that are collected when the lift is sent to another level.

8. The three-dimensional goods storage arrangement according to claim 1, wherein the control function reverses the position of goods inserted one after another in a row in a second channel.

* * * * *